(12) United States Patent
Fang et al.

(10) Patent No.: US 8,868,697 B2
(45) Date of Patent: Oct. 21, 2014

(54) METHOD AND SYSTEM FOR DEVICE MANAGEMENT, AND DEVICE

(75) Inventors: Ping Fang, Shenzhen (CN); Huangwei Wu, Shenzhen (CN); Qinliang Zhang, Shenzhen (CN); Yu Zhu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 118 days.

(21) Appl. No.: 13/531,059

(22) Filed: Jun. 22, 2012

(65) Prior Publication Data

US 2012/0265862 A1    Oct. 18, 2012

Related U.S. Application Data

(63) Continuation of application No. PCT/CN2010/078846, filed on Nov. 18, 2010.

(30) Foreign Application Priority Data

Dec. 29, 2009 (CN) .......................... 2009 1 0252584

(51) Int. Cl.
*G06F 15/177* (2006.01)
*H04L 12/24* (2006.01)

(52) U.S. Cl.
CPC ............ *H04L 12/24* (2013.01); *H04L 41/0233* (2013.01)
USPC ....................................................... 709/220

(58) Field of Classification Search
CPC ......... H04L 12/28; H04L 12/24; H04L 29/06; H04L 12/66; H04L 29/08; G06F 13/10; G06F 17/30; G06F 15/173
USPC ........................................................ 709/220
See application file for complete search history.

(56) References Cited

U.S. PATENT DOCUMENTS

| 7,266,595 B1* | 9/2007 | Black et al. .................... 709/223 |
| 7,693,976 B2* | 4/2010 | Perry et al. ..................... 709/223 |
| 8,561,069 B2* | 10/2013 | Masuoka et al. .............. 718/100 |

(Continued)

FOREIGN PATENT DOCUMENTS

| CN | 1669272 A | 9/2005 |
| CN | 1968146 A | 5/2007 |

(Continued)

OTHER PUBLICATIONS

Extended European Search Report issued in corresponding European Patent Application No. 10840448.4, mailed Sep. 5, 2012.

(Continued)

*Primary Examiner* — Tu Nguyen
(74) *Attorney, Agent, or Firm* — Brinks Gilson & Lione

(57) ABSTRACT

The present invention discloses a method and a system for device management and a device, and relates to the field of communications technologies. The method includes: mapping information of a first command supported by a proxied device to an object in a data model; receiving a second command which is used for setting the object in the data model and is sent by a management device; and sending the first command to the proxied device according to the setting of the object in the data model by the second command, and reporting a result of executing, by the proxied device, the first command to the management device as a response of the second command.

20 Claims, 3 Drawing Sheets

(56) References Cited

U.S. PATENT DOCUMENTS

| | | |
|---|---|---|
| 2006/0013217 A1 | 1/2006 | Datla et al. |
| 2006/0015617 A1 | 1/2006 | Castro et al. |
| 2008/0215668 A1 | 9/2008 | Hu |
| 2012/0166660 A1 | 6/2012 | Zhang et al. |

FOREIGN PATENT DOCUMENTS

| | | |
|---|---|---|
| CN | 101094104 A | 12/2007 |
| CN | 101304350 A | 11/2008 |
| CN | 101795288 A | 8/2010 |
| EP | 2015179 A1 | 1/2009 |
| EP | 2148469 A1 | 1/2010 |
| WO | WO 2008/138260 A1 | 11/2008 |

OTHER PUBLICATIONS

Office Action issued in corresponding Chinese Patent Application No. 200910252584.0, mailed Apr. 19, 2013.

International Search Report and Written Opinion of the International Searching Authority issued in corresponding PCT Patent Application No. PCT/CN2010/078846, mailed Feb. 24, 2011.

Spets et al., "PD-174 Open Items" PD-174. BroadbandHome Technical Working Group, Nov. 2009.

Office Action issued in corresponding Chinese Patent Application No. 200910252584.0, mailed Jul. 20, 2012.

* cited by examiner

METHOD AND SYSTEM FOR DEVICE MANAGEMENT, AND DEVICE

CROSS-REFERENCE TO RELATED APPLICATIONS

This application is a continuation of International Application No. PCT/CN2010/078846, filed on Nov. 18, 2010, which claims priority to Chinese Patent Application No. 200910252584.0, filed on Dec. 29, 2009, both of which are hereby incorporated by reference in their entireties.

FIELD OF THE INVENTION

The present invention relates to the field of communications technologies, and in particular, to a method and a system for device management, and a device.

BACKGROUND OF THE INVENTION

With the increasing enrichment of telecommunication services, demands of a user for bandwidths become larger and larger, and the DSL (Digital Subscriber Line, digital subscriber line) as a broadband access technology has been widely applied. In DSL networking, auto-configuration and management may be performed on a CPE (Customer Premises Equipment, customer premises equipment) through an ACS (Auto-Configuration Server, auto-configuration server).

For convenience of illustration, the ACS is referred to as a management device, and the CPE that can only be managed by the ACS in a proxy manner is referred to as a proxied device. In the prior art, when management on a proxied device is implemented, the management device needs to send a command for managing the proxied device to a proxy device, and after receiving the command, the proxy device needs to intelligently convert it into a command corresponding to a protocol supported by the proxied device, and then send the converted command to the proxied device. However, when obtaining a command executing result of the proxied device, the management device needs to send a query command to the proxy device again.

In the procedure of implementing the present invention, the inventor finds that the manner of managing the proxied device in the prior art at least has the following disadvantages:

In an existing proxy solution, the proxy device needs to intelligently understand a data model of the proxied device and a management command of the proxied device, and implement command conversion between the management device and the proxied device, and therefore, proxy requirements for the proxy device are excessively high. Additionally, the management device needs to send the command repeatedly, so as to implement management on the proxied device and obtain a management command executing result, thereby resulting in low management efficiency.

SUMMARY OF THE INVENTION

In order to reduce proxy requirements for a proxy device, and implement efficient remote management on a proxied device, embodiments of the present invention provide a method and a system for device management, and a device. The technical solutions are as follows:

According to one aspect, a method for device management is provided, where the method includes:

obtaining information of a first command supported by a proxied device, and mapping the information of the first command supported by the proxied device to an object in a data model;

receiving a second command which is used for setting the object in the data model and is sent by a management device;

sending the first command to the proxied device according to the setting of the object in the data model by the second command, and receiving an executing result of the first command, where the executing result of the first command is returned by the proxied device; and reporting a response of the second command to the management device, where the response includes information of the executing result of the first command executed by the proxied device.

According to another aspect, a system for device management is provided, where the system includes: a management device, a proxy device and a proxied device.

The management device is configured to send a second command used for setting a data model object of the proxy device to the proxy device; and receive a response of the second command, where the response of the second command is reported by the proxy device.

The proxy device is configured to obtain information of a first command supported by the proxied device, and map the information of the first command supported by the proxied device to an object in a data model; receive a second command which is used for setting the object in the data model and is sent by the management device; send the first command to the proxied device according to the setting of the object in the data model by the second command, and receive an executing result of the first command, where the executing result of the first command is returned by the proxied device; and report a response of the second command to the management device, where the response includes information of the executing result of the first command executed by the proxied device.

The proxied device is configured to receive the first command sent by the proxy device, and return the executing result of the first command to the proxy device.

A management device is further provided, where the management device includes:

a sending module, configured to send a second command to a proxy device, where the second command is used for setting an object in a data model of the proxy device, so that the proxy device sends a first command to a proxied device according to the setting of the object in the data model by the second command; and a receiving module, configured to receive a response of the second command, where the response of the second command is reported by the proxy device, and the response includes information of an executing result of the first command executed by the proxied device.

A proxy device is further provided, where the proxy device includes:

an obtaining module, configured to obtain information of a first command supported by a proxied device;

a mapping module, configured to map the obtained information of the first command supported by the proxied device to an object in a data model;

a first receiving module, configured to receive a second command sent by a management device, where the second command is used for setting the object which is in the data model and obtained through mapping;

a sending module, configured to send the first command to the proxied device according to the setting of the object in the data model by the second command;

a second receiving module, configured to receive an executing result of the first command, where the executing result of the first command is returned by the proxied device; and a reporting module, configured to report a response of the second command to the management device, where the response includes information of the executing result of the first command executed by the proxied device.

Beneficial effects of the technical solutions provided by the embodiments of the present invention are as follows:

The first command supported by the proxied device is mapped to the data model of the proxy device, so that the proxy device can conveniently provide a proxy service for different types of proxied devices, thereby reducing proxy requirements for the proxy device; additionally, the management device may implement management on the proxied device and obtain the executing result merely through a single command, thereby not only reducing management complexity of the management device, but also improving management efficiency.

BRIEF DESCRIPTION OF THE DRAWINGS

To illustrate the technical solutions according to the embodiments of the present invention more clearly, accompanying drawings needed for describing the embodiments are introduced briefly below. Apparently, the accompanying drawings in the following description are only some embodiments of the present invention, and persons of ordinary skill in the art may further obtain other drawings from the accompanying drawings without creative efforts.

DETAILED DESCRIPTION OF THE EMBODIMENTS

In order to make the objectives, technical solutions, and advantages of the present invention more clearly, implementation manners of the present invention are further described in detail below with reference to the accompanying drawings.

Embodiment 1

Figure 1:
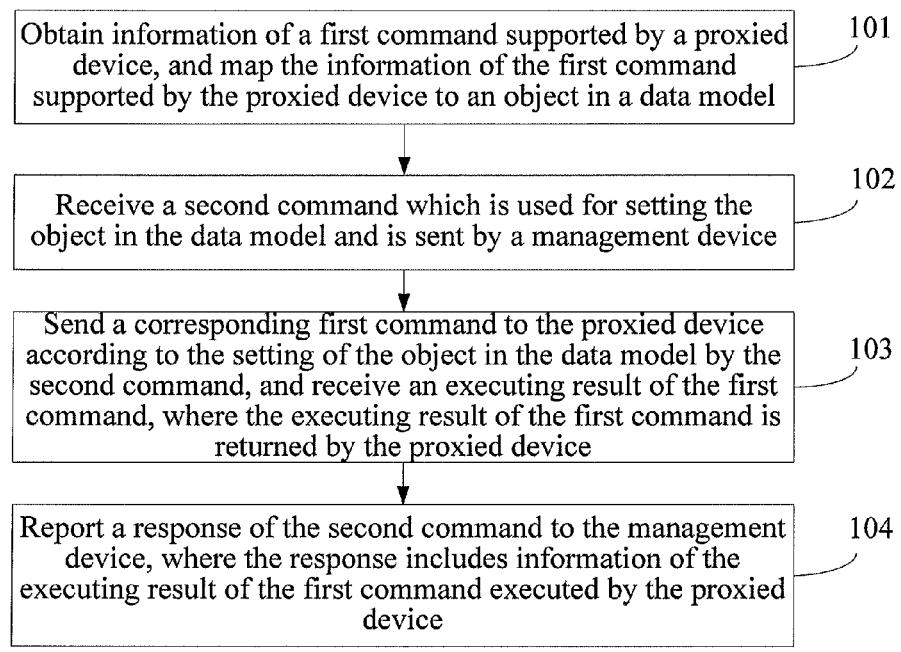
FIG. 1 is a flowchart of a method for device management according to a first embodiment of the present invention.

Referring to FIG. 1, this embodiment provides a method for device management, and a method process is specifically as follows:

101: Obtain information of a first command supported by a proxied device, and map the information of the first command supported by the proxied device to an object in a data model.

102: Receive a second command which is used for setting the object in the data model and is sent by a management device.

103: Send a corresponding first command to the proxied device according to the setting of the object in the data model by the second command, and receive an executing result of the first command, where the executing result of the first command is returned by the proxied device.

104: Report a response of the second command to the management device, where the response includes information of the executing result of the first command executed by the proxied device.

According to the method provided in this embodiment, the proxy device may implement establishment of a data model object in the proxy device directly according to the first command supported by the proxied device, and may generate the corresponding first command according to the setting of the data model object by the management device, and the proxy device does not need to understand a data model and a command which are supported by the proxied device, thereby reducing proxy requirements for the proxy device. Additionally, the information of the executing result of the first command executed by the proxied device is reported to the management device as the response of the second command, so that the management device may implement management on the proxied device and obtain the executing result merely through a single command, thereby not only reducing management complexity of the management device, but also improving management efficiency.

Embodiment 2

Figure 2:
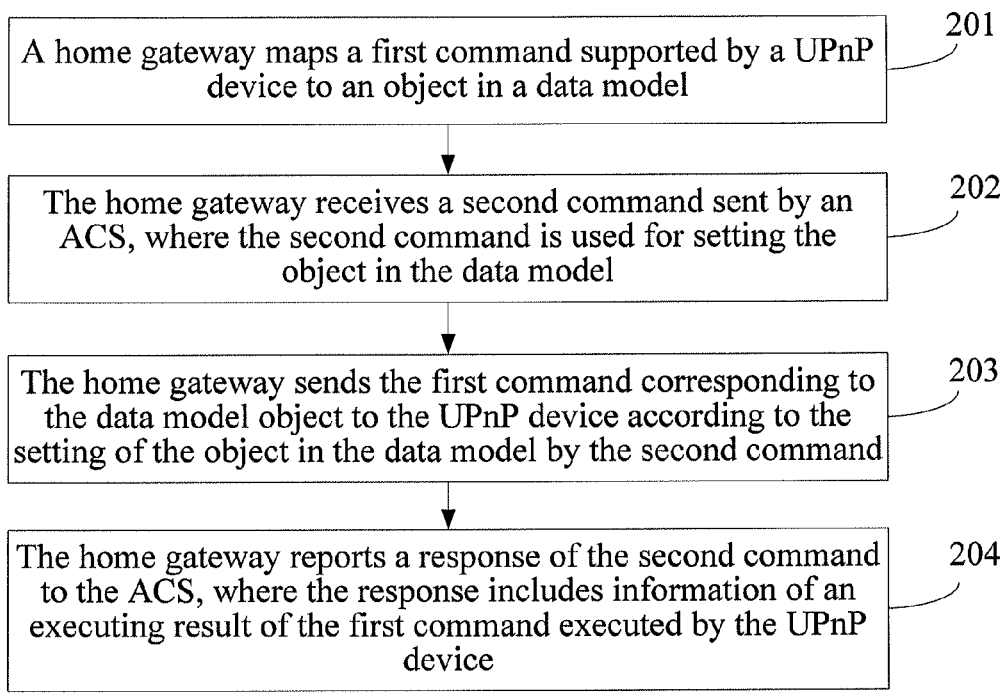
FIG. 2 is a flowchart of a method for device management according to a second embodiment of the present invention.

This embodiment provides a method for device management, and the method adopts a manner in which a command supported by a proxied device is directly mapped to a data model of a proxy device and an existing TR-069 protocol is extended, so that a management device implements efficient remote management on the proxied device. For convenience of illustration, an example that the proxied device is a UPnP (Universal Plug and Play, universal plug and play) device, the proxy device is a home gateway, and the management device is an ACS is taken to illustrate the method for device management provided in this embodiment in detail. Referring to FIG. 2, a method process is specifically as follows:

201: A home gateway maps a first command (Action) supported by a UPnP device to an object in a data model.

For this step, the home gateway needs to first obtain the first command supported by the UPnP device. This embodiment does not specifically limit the first command supported by the UPnP device and obtained by the home gateway, and an example that the obtained first command supported by the UPnP device is a GetLogInfo command in a UPnP DM (Device Management, device management) BMS (Basic Management Service, basic management service) is taken. When the GetLogInfo command is obtained, specifically, a device description file of the UPnP device may be first obtained, an XML (Extensible Markup Language, extensible markup language) URL (Uniform Resource Locator, uniform resource locator) of the BMS is further obtained, and finally, Action supported of the BMS is parsed, so that the GetLogInfo command in the UPnP DM BMS is obtained, and the GetLogInfo command includes parameters shown in Table 1 below.

TABLE 1

| Argument Parameter | Direction Input Output | Related State Variable Parameter Type |
|---|---|---|
| LogURI | IN input parameter | A_ARG_TYPE_LogURI |
| Enabled | OUT output parameter | A_ARG_TYPE_Boolean |
| LogLevel | OUT output parameter | A_ARG_TYPE_LogLevel |
| LogURL | OUT output parameter | A_ARG_TYPE_LogURL |
| MaxSize | OUT output parameter | A_ARG_TYPE_LogMaxSize |
| LastChange | OUT output parameter | A_ARG_TYPE_DateTime |

After the GetLogInfo command is obtained, when the home gateway maps the GetLogInfo command to the object in the data model, a data model object is determined by the GetLogInfo command, as shown in the content in the corresponding Table 1, and a name of the data model object is a name of the first command. Because the GetLogInfo command includes an input parameter and an output parameter, the data model object also includes an input parameter of the GetLogInfo command and an output parameter of the GetLogInfo command. Additionally, the data model object may further include an "Invoke" parameter, and content of the generated data model object is as shown in Table 2 below:

TABLE 2

| Name | Writable or Not |
|---|---|
| InternetGatewayDevice.ProxiedService.Device1.Service1.Action.GetLogInfo. | — |
| LogURI | W |
| Enabled | — |
| LogLevel | — |
| LogURL | — |
| MaxSize | — |
| LastChange | — |
| Invoke | W |
| ErrorCode | — |
| ErrorDescription | — |

In Table 2, the InternetGatewayDevice object represents the home gateway, the ProxiedService object represents a proxy management service provided by the home gateway, where various proxied devices are included, the Device1 object represents a corresponding UPnP device, the Service1 object represents a BMS Service provided by the UPnP, and the Action object represents the first command supported by the UPnP device, where in this embodiment, GetLogInfo is taken as an example, and certainly, the first command may also be other commands. The GetLogInfo object corresponds to the GetLogInfo command in the BMS, and the object includes corresponding input and output parameters, where the input parameter is correspondingly writable, that is, may be set by the management device, and the output parameter is unwritable. "Invoke" can be set by the management device, to trigger the home gateway to send the first command to manage the UPnP device. For example, when Invoke is set from 0 to 1, the home gateway sends the first command GetLogInfo, and when receiving an executing result of the first command GetLogInfo, the home gateway automatically sets Invoke to 0.

Further, Table 2 also includes ErrorCode and ErrorDescription parameters, which are used for returning error information when an error occurs in executing the first command by the proxied device; when the proxy device receives the error information of the proxied device, the ErrorCode and ErrorDescription parameters are returned to the management device, instead of returning other OutputParameterNames.

202: The home gateway receives a second command sent by an ACS, where the second command is used for setting the object in the data model of the home gateway.

Specifically, in this embodiment, an example that the second command is InvokeProxiedAction (InputParameterList, OutputParameterNames, ParameterKey) is taken, InputParameterList is an RPC (Remote Procedure Call Protocol, remote procedure call protocol) command, and is used for setting the input parameter of the data model object in the home gateway, and the OutputParameterNames parameter name is used for obtaining a command executing result.

The second command is not defined in the current TR-069 protocol yet, and the existing TR-069 protocol needs to be extended. Parameter explanation of the second command InvokeProxiedAction is as shown in Table 3 below.

TABLE 3

| Parameter | Type | Description |
|---|---|---|
| InputParameterList | ParameterValue Struct[ ] | The parameter is a list of input parameter names and corresponding values, is used for setting an input parameter in the corresponding data model object to a corresponding value, and may include 0 or N parameters and corresponding values. |
| OutputParameterNames | string(256) [ ] | The parameter is a character string array, includes a name of a parameter, a value of which the ACS intends to obtain, and may include 0 or N parameter names. |
| ParameterKey | string(32) | Used for setting a value of ParameterKey, and the value of ParameterKey is written into the data model only when the command is successfully executed. |

An example that the second command sent by the ACS is used for setting the first command GetLogInfo is taken, InputParameterList needs to include parameters LogURI and Invoke, and is used for setting the input parameter in the data model GetLogInfo object. Optionally, the set parameter may also only include Invoke without other parameters, and the home gateway utilizes a value of an original input parameter in the data model as a corresponding input. OutputParameterNames includes zero, one or multiple of Enabled, LogLevel, LogURL, MaxSize, and LastChanged, which depends on a result that the ACS intends to obtain.

203: The home gateway sends the first command corresponding to the data model object to the UPnP device according to the setting of the object in the data model by the second command.

Specifically, after the second command InvokeProxiedAction sent by the ACS sets the GetLogInfo object, and it is detected that the value of the "Invoke" parameter in the GetLogInfo object is modified, the home gateway sends the GetLogInfo command to the UPnP device according to the input parameter and the output parameter that are in the data model object after being set and the name of the data model object, that is, the name GetLogInfo of the first command.

Certainly, here, it is also possible that the Invoke parameter does not exist, and after detecting that an input parameter is modified, the proxy device sends a corresponding first command to the UPnP device, which is not specifically limited in this embodiment. Further, when an error occurs in the procedure of executing InvokeProxiedAction by the proxy device, the first command is not sent to the proxied device, but error information is directly reported to the management device.

204: The home gateway reports a response of the second command to the ACS, where the response includes information of the executing result of the first command executed by the UPnP device.

For this step, after the UPnP device completes executing the GetLogInfo command, the UPnP device returns the executing result of the GetLogInfo command to the home gateway, and after receiving the executing result of the GetLogInfo command, where the executing result of the GetLogInfo command is returned by the UPnP device, the home gateway reports the information of the executing result as the response of the second command to the ACS. Specifically, the home gateway may report the information of the executing result of the GetLogInfo command executed by the UPnP device to the ACS by using InvokeProxyingActionResponse, where the response includes a parameter value of OutputParameterNames in the InvokeProxyingAction command, and its parameter explanation is as shown in Table 4 below.

TABLE 4

| Parameter | Type | Description |
| --- | --- | --- |
| OutputParameterList | ParameterValueStruct[ ] | The parameter is a list of output parameter names and corresponding values, and is used for returning a value of an InvokeProxiedAction command. |

Preferably, if the UPnP device cannot normally execute the GetLogInfo command, when knowing that an error occurs in executing the GetLogInfo command by the UPnP device, the home gateway generates an alarm to the ACS, so that the ACS knows that management on the UPnP device fails. However, how the home gateway knows that an error occurs in executing the GetLogInfo command by the UPnP device is not specifically limited in this embodiment; for example, the home gateway may know that an error occurs in executing the GetLogInfo command by the UPnP device by obtaining ErrorCode information and ErrorDescription information that are returned by the UPnP device, sends the ErrorCode information and the ErrorDescription information to the ACS as the executing result of the management command of the ACS, notifies the ACS that the management on the UPnP device fails, and does not send other OutputParameterList parameter information. Further, after preset time, if the home gateway neither receives the executing result of executing the GetLogInfo command, where the executing result of executing the GetLogInfo command is returned by the UPnP device, nor receives the ErrorCode information and the ErrorDescription information, it is judged that an error occurs in executing the GetLogInfo command by the UPnP device.

Optionally, after receiving the information of the executing result sent by the UPnP device, the home gateway may further save the information of the executing result, that is, write the executing result into the output parameter in GetLogInfo (a parameter in the data model which is unwritable represents that the parameter cannot be written by the ACS, but may be modified by the home gateway device itself), and modify a value of the Invoke parameter in the GetLogInfo object, which represents that executing of a corresponding command is already completed.

The proxy device may implement establishment of a data model object in the proxy device directly according to the command supported by the proxy device, and may generate the corresponding command of a managed device according to the setting of the data model object by the management device, and the proxy device does not need to understand a data model and a command which are supported by the proxied device, thereby reducing proxy requirements for the proxy device. Additionally, the result of the management command executed by the proxied device is reported to the management device as a response of the management command, so that the management device may implement management on the proxied device and obtain the executing result merely through a single command, thereby not only reducing management complexity of the management device, but also improving management efficiency.

Embodiment 3

Figure 3:
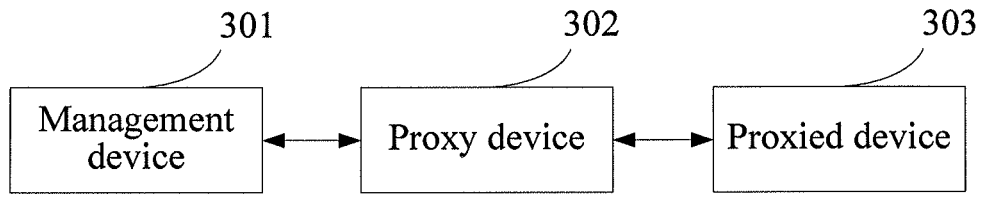
FIG. 3 is a schematic structural diagram of a system for device management according to a third embodiment of the present invention.

Referring to FIG. 3, this embodiment provides a system for device management, and the system includes: a management device 301, a proxy device 302 and a proxied device 303.

The management device 301 is configured to send a second command used for setting a data model object of the proxy device 302 to the proxy device 302; and receive a response of the second command, where the response of the second command is reported by the proxy device 302, and the response includes information of an executing result of a first command executed by the proxied device 303.

The proxy device 302 is configured to obtain information of the first command supported by the proxied device 303, and map the information of the first command supported by the proxied device 303 to an object in a data model; receive the second command which is used for setting the object in the data model and is sent by the management device 301; send a corresponding first command to the proxied device 303 according to the setting of the object in the data model by the second command, and receive the executing result of the first command, where the executing result of the first command is returned by the proxied device 303; and report the response of the second command to the management device 301, where the response includes the information of the executing result of the first command executed by the proxied device 303.

The proxied device 303 is configured to receive the first command sent by the proxy device 302, and return the executing result of the first command to the proxy device 302.

Specifically, the proxy device 302, when mapping the information of the first command supported by the proxied device 303 to the object in the data model, is specifically configured to map the information of the first command supported by the proxied device 303 to a data model object that includes an input parameter of the first command and an output parameter of the first command, where a name of the data model object is a name of the first command.

Correspondingly, the second command sent by the management device 301 is specifically used for setting the input parameter in the data model object in the proxy device 302.

Alternatively, the proxy device 302, when mapping the information of the first command supported by the proxied device 303 to the object in the data model, is specifically configured to map the information of the first command supported by the proxied device 303 to a data model object that includes an input parameter of the first command, an output parameter of the first command and an invocation parameter of the first command, where a name of the data model object is a name of the first command.

Correspondingly, the second command sent by the management device 301 is specifically used for setting the invocation parameter and the input parameter that are in the data model object in the proxy device 302.

Further, the proxy device 302, when sending the first command to the proxied device 303 according to the setting of the object in the data model by the second command, is specifically configured to send the first command to the proxied device 303 according to the input parameter and the output parameter that are in the data model object after being set, and the name of the data model object.

The proxy device 302, when receiving the executing result of the first command, where the executing result of the first command is returned by the proxied device 303, is specifically configured to receive an executing result which is returned by the proxied device 303 and carries an output parameter value of the first command; or, receive an executing result which is returned by the proxied device 303 and carries error information of executing the first command.

Correspondingly, the proxied device 303, when returning the executing result of the first command to the proxy device 302, is specifically configured to return the executing result which carries the output parameter value of the first command to the proxy device 302, or return the executing result which carries the error information of executing the first command to the proxy device 302.

In the system provided by this embodiment, the proxy device may implement establishment of a data model object in the proxy device directly according to the first command supported by the proxied device, and may send the corresponding first command to a managed device according to the setting of the data model object by the management device, and the proxy device does not need to understand a data model and a command which are supported by the proxied device, thereby reducing proxy requirements for the proxy device. Additionally, the result of the first command executed by the proxied device is reported as the response of the second command to the management device, so that the management device may implement management on the proxied device and obtain the executing result merely through a single command, thereby not only reducing management complexity of the management device, but also improving management efficiency.

Embodiment 4

Figure 4:
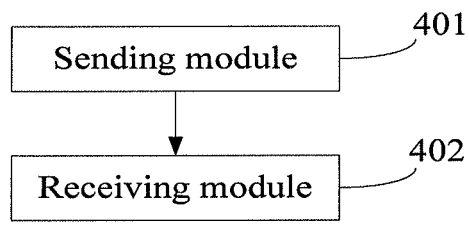
FIG. 4 is a schematic structural diagram of a management device according to a fourth embodiment of the present invention.

Referring to FIG. 4, this embodiment provides a management device, and the management device includes:

a sending module 401, configured to send a second command to a proxy device, where the second command is used for setting an object in a data model of the proxy device, so that the proxy device sends a first command to a proxied device according to the setting of the object in the data model by the second command; and a receiving module 402, configured to receive a response of the second command, where the response of the second command is reported by the proxy device, and the response includes information of an executing result of the first command executed by the proxied device.

The second command sent by the sending module 401 is specifically used for setting an invocation parameter in the data model object of the proxy device, or setting an invocation parameter and an input parameter that are in the data model object of the proxy device.

The management device provided in this embodiment sends the second command used for setting the data model object of the proxy device to the proxy device, so that the proxy device sends the first command to the proxied device according to the setting of the object in the data model by the second command, and reports the result of the first command executed by the proxied device as the response of the second command to the management device, so that management on the proxied device by the management device and obtaining of the executing result are implemented merely through one command, thereby reducing management complexity of the management device, and further improving management efficiency of the management device.

Embodiment 5

Figure 5:
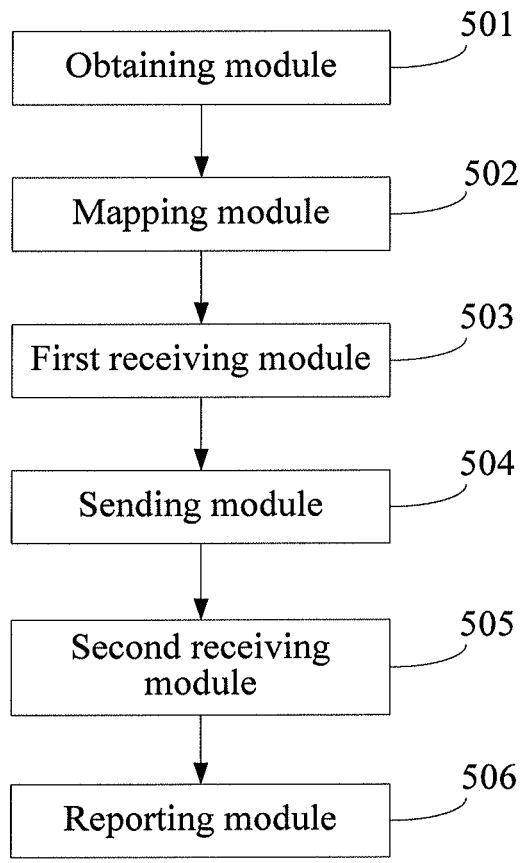
FIG. 5 is a schematic structural diagram of a proxy device according to a fifth embodiment of the present invention.

Referring to FIG. 5, this embodiment provides a proxy device, and the proxy device includes:

an obtaining module 501, configured to obtain information of a first command supported by a proxied device;

a mapping module 502, configured to map the obtained information of the first command supported by the proxied device to an object in a data model;

a first receiving module 503, configured to receive a second command sent by a management device, where the second command is used for setting the object which is in the data model and obtained through mapping;

a sending module 504, configured to send a corresponding first command to the proxied device according to the setting of the object in the data model by the second command;

a second receiving module 505, configured to receive an executing result of the first command, where the executing result of the first command is returned by the proxied device; and a reporting module 506, configured to report a response of the second command to the management device, where the response includes information of the executing result of the first command executed by the proxied device.

Specifically, the mapping module 502 is specifically configured to map the information of the first command supported by the proxied device to a data model object that includes an input parameter of the first command and an output parameter of the first command, where a name of the data model object is a name of the first command.

Optionally, the mapping module 502 is specifically configured to map the information of the first command supported by the proxied device to a data model object that includes an input parameter of the first command, an output parameter of the first command and an invocation parameter of the first command, where a name of the data model object is a name of the first command.

The sending module 504 is specifically configured to send the first command to the proxied device according to the input parameter and the output parameter that are in the data model object after being set, and the name of the data model object.

The second receiving module 505 is specifically configured to receive an executing result which is returned by the proxied device and carries an output parameter value of the first command; or, receive an executing result which is returned by the proxied device and carries error information of executing the first command.

To sum up, the proxy device provided by this embodiment directly maps the first command supported by the proxied device to the object in the data model, and may send the corresponding first command to the proxied device according to the setting of the data model object by the management device, and the proxy device does not need to understand a data model and a command which are supported by the proxied device, thereby reducing proxy requirements for the proxy device. Additionally, the result of the first command executed by the proxied device is reported as the response of the second command to the management device, so that the management device may implement management on the proxied device and obtain the executing result merely through a single command, thereby not only reducing management complexity of the management device, but also improving management efficiency.

The sequence numbers of the foregoing embodiments of the present invention are merely for convenience of description, and do not imply the preference of the embodiments.

Part of the steps in the embodiments of the present invention may be implemented by using software, and a corresponding software program may be stored in a readable storage medium such as a compact disk or a hard disk.

The foregoing descriptions are merely exemplary embodiments of the present invention, but not intended to limit the present invention. Any modification, equivalent replacement, and improvement made without departing from the spirit and principle of the present invention shall fall within the protection scope of the present invention.

What is claimed is:

1. A method for device management, comprising:
   obtaining, by a proxy device, information of a first command supported by a proxied device, and mapping the information of the first command supported by the proxied device to an object in a the data model, wherein mapping the information of the first command to the object is based on i) respective input parameters of the first command and the object and ii) respective output parameters of the first command and the object;
   receiving a second command which is used for setting the object in the data model and is sent by a management device;
   generating, by the proxy device, the first command according to the data model;
   sending the first command to the proxied device according to the setting of the object in the data model by the second command, and receiving an executing result of the first command, wherein the executing result of the first command is returned by the proxied device; and
   reporting a response of the second command to the management device, wherein the response comprises information of the executing result of the first command executed by the proxied device.

2. The method according to claim 1, wherein mapping the information of the first command supported by the proxied device to the object in the data model comprises:
   mapping the information of the first command supported by the proxied device to a data model object that comprises an input parameter of the first command and an output parameter of the first command, wherein a name of the data model object is a name of the first command; and
   correspondingly, the second command is used for setting the input parameter in the data model object.

3. The method according to claim 2, wherein the sending the first command to the proxied device according to the setting of the object in the data model by the second command comprises:
   sending the first command to the proxied device according to the input parameter and the output parameter that are in the data model object after being set, and the name of the data model object.

4. The method according to claim 1, wherein the mapping the information of the first command supported by the proxied device to the object in the data model comprises:
   mapping the information of the first command supported by the proxied device to a data model object that comprises an input parameter of the first command, an output parameter of the first command and an invocation parameter of the first command, wherein a name of the data model object is a name of the first command; and
   correspondingly, the second command is used for setting the invocation parameter and the input parameter that are in the data model object.

5. The method according to claim 4, wherein the sending the first command to the proxied device according to the setting of the object in the data model by the second command comprises:
   sending the first command to the proxied device according to the input parameter and the output parameter that are in the data model object after being set, and the name of the data model object.

6. The method according to claim 1, wherein the receiving the executing result of the first command, wherein the executing result of the first command is returned by the proxied device, specifically comprises one of:
   receiving an executing result which is returned by the proxied device and carries an output parameter value of the first command;
   or, receiving an executing result which is returned by the proxied device and carries error information of executing the first command.

7. A system for device management, comprising: a management device, a proxy device and a proxied device, wherein
   the management device is configured to send a second command used for setting a data model object of the proxy device to the proxy device; and receive a response of the second command, wherein the response of the second command is reported by the proxy device;
   the proxy device is configured to obtain information of a first command supported by the proxied device, and map the information of the first command supported by the proxied device to an object in a data model; receive the second command which is used for setting the object in the data model and is sent by the management device; generate the first command according to the data model; send the first command to the proxied device according to the setting of the object in the data model by the second command, and receive an executing result of the first command, wherein the executing result of the first command is returned by the proxied device; and report the response of the second command to the management device, wherein the response comprises information of the executing result of the first command executed by the proxied device, wherein mapping the information of the first command to the object is based on i) respective input parameters of the first command and the object and ii) respective output parameters of the first command and the object; and the proxied device is configured to receive the first command sent by the proxy device, and return the executing result of the first command to the proxy device.

8. The system according to claim 7, wherein the proxy device, when mapping the information of the first command supported by the proxied device to the object in the data model, is configured to map the information of the first command supported by the proxied device to a data model object that comprises an input parameter of the first command and an output parameter of the first command, wherein a name of the data model object is a name of the first command; and corresponingly, the second command sent by the management device is used for setting the input parameter in the data model object.

9. The system according to claim 8, wherein the proxy device, when sending the first command to the proxied device according to the setting of the object in the data model by the second command, is configured to send the first command to the proxied device according to the input parameter and the output parameter that are in the data model object after being set, and the name of the data model object.

10. The system according to claim 7, wherein the proxy device, when mapping the information of the first command supported by the proxied device to the object in the data model, is configured to map the information of the first command supported by the proxied device to a data model object that comprises an input parameter of the first command, an output parameter of the first command and an invocation parameter of the first command, wherein a name of the data model object is a name of the first command; and correspondingly, the second command sent by the management device is used for setting the invocation parameter and the input parameter that are in the data model object.

11. The system according to claim 10, wherein the proxy device, when sending the first command to the proxied device according to the setting of the object in the data model by the second command, is configured to send the first command to the proxied device according to the input parameter and the output parameter that are in the data model object after being set, and the name of the data model object.

12. The system according to claim 7, wherein the proxy device, when receiving the executing result of the first command, wherein the executing result of the first command is returned by the proxied device, is configured to receive an executing result which is returned by the proxied device and carries an output parameter value of the first command; or, receive an executing result which is returned by the proxied device and carries error information of executing the first command; and correspondingly, the proxied device, when returning the executing result of the first command to the proxy device, is configured to return the executing result which carries the output parameter value of the first command to the proxy device, or return the executing result which carries the error information of executing the first command to the proxy device.

13. A management device, comprising:
a sending module, configured to send a second command to a proxy device, wherein the second command is used for setting an object in a data model of the proxy device, so that the proxy device sends a first command to a proxied device according to the setting of the object in the data model by the second command and wherein information of the first command is mapped to the object in the data model by the proxy device, wherein mapping the information of the first command to the object is based on i) respective input parameters of the first command and the object and ii) respective output parameters of the first command and the object; and a receiving module, configured to receive a response of the second command, wherein the first command is generated by the proxy device according to the data model and the response of the second command is reported by the proxy device, and the response comprises information of an executing result of the first command executed by the proxied device.

14. The management device according to claim 13, wherein the second command sent by the sending module is used for setting an invocation parameter in the data model object of the proxy device, or setting an invocation parameter and an input parameter that are in the data model object of the proxy device.

15. A proxy device, comprising:
an obtaining module, configured to obtain information of a first command supported by a proxied device;
a mapping module, configured to map the obtained information of the first command supported by the proxied device to an object in a data model, wherein mapping the information of the first command to the object is based on i) respective input parameters of the first command and the object and ii) respective output parameters of the first command and the object;
a first receiving module, configured to receive a second command sent by a management device, wherein the second command is used for setting the object which is in the data model and obtained through mapping wherein the first command is generated by the proxy device according to the data model;
a sending module, configured to send the first command to the proxied device according to the setting of the object in the data model by the second command;
a second receiving module, configured to receive an executing result of the first command, wherein the executing result of the first command is returned by the proxied device; and
a reporting module, configured to report a response of the second command to the management device, wherein the response comprises information of the executing result of the first command executed by the proxied device.

16. The proxy device according to claim 15, wherein the mapping module is configured to map the information of the first command supported by the proxied device to a data model object that comprises an input parameter of the first command and an output parameter of the first command, wherein a name of the data model object is a name of the first command.

17. The proxy device according to claim 16, wherein the sending module is configured to send the first command to the proxied device according to the input parameter and the output parameter that are in the data model object after being set, and the name of the data model object.

18. The proxy device according to claim 15, wherein the mapping module is configured to map the information of the first command supported by the proxied device to a data model object that comprises an input parameter of the first command, an output parameter of the first command and an invocation parameter of the first command, wherein a name of the data model object is a name of the first command.

19. The proxy device according to claim 18, wherein the sending module is configured to send the first command to the proxied device according to the input parameter and the output parameter that are in the data model object after being set, and the name of the data model object.

20. The proxy device according to claim 15, wherein the second receiving module is configured to receive an executing result which is returned by the proxied device and carries an output parameter value of the first command; or, receive an executing result which is returned by the proxied device and carries error information of executing the first command.

* * * * *